Aug. 9, 1966 H. GORMAN 3,265,396

LAMINATED PAPER RECORDS

Filed Feb. 12, 1963 2 Sheets-Sheet 1

HARRY GORMAN
INVENTOR.

BY Homer J. Bridger

AGENT

Aug. 9, 1966 H. GORMAN 3,265,396

LAMINATED PAPER RECORDS

Filed Feb. 12, 1963 2 Sheets-Sheet 2

HARRY GORMAN
INVENTOR.

BY

AGENT

United States Patent Office 3,265,396

Patented August 9, 1966

3,265,396

LAMINATED PAPER RECORDS

Harry Gorman, 2717 Holland Ave., New York, N.Y.

Filed Feb. 12, 1963, Ser. No. 258,020

3 Claims. (Cl. 274—42)

This invention relates to phonograph records and more particularly to laminated paper phonograph records.

Laminated records have been known for some time. Ever since their earliest use it has been recognized that "such a compound disc quickly warps to such an extent as to spoil appearance and usefulness of the sound record." (McDonald U.S. Patent 862,407 issued in 1907). Due to the diverse physical natures of the fibrous support layer and the sound recording layer, changes in temperature or humidity cause contractions and expansions. The resulting stresses at the interface between the two layers causes warping of thin laminated records. Several approaches for solving this problem have been tried but until now had not succeeded due either to high manufacturing costs or faults basic to the various approaches. At present the laminated paper records that are commercially available are those having support thick stock to maintain reasonable dimensional stability.

It is an object of this invention to provide laminated paper records having relatively thin supports. It is another object of this invention to provide thin paper records having dimensional stability and good fidelity. It is another object of this invention to provide laminated records on printed paper stock thin enough for binding into books and magazines and whose cost of materials and production lends itself for such purposes. It is a further object to provide an audiovisual material that combines full fidelity voice and music with printed pictorial and textual material for advertising and educational purposes at reasonable cost. Other objects, features and advantages of this invention will be apparent hereinafter in the drawings in which:

Figure 1:
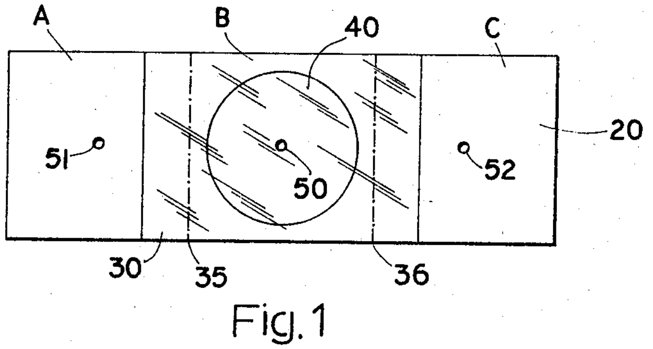
FIG. 1 is a plan view of the record sheet in the unfolded condition according to one aspect of this invention.

In describing the embodiments of this invention as illustrated in the drawings it is to be understood that each of the individual embodiments is the preferred one, since each has its own advantages for the specific purpose for which it is intended. Further, where specific terminology is utilized or specific materials mentioned it is understood that the invention is not restricted to such terms or materials but that all useful and functionally equivalents of such terms and materials are intended and included thereby.

This invention is based on the finding that when laminated paper records are folded along at least two opposite sides there is provided by the stretching of the laminated record surface and the restriction and constriction of the base material in the areas of the fold, sufficient stiffness or perhaps reverse stress concentration as to overcome stresses within the record that normally might cause warping. I have noted that a single fold along only one side does not provide any such stiffness but rather it tends to aggravate the warping so that a curl is often imparted to the records.

The term paper records emcompasses several varieties of records that consist of a base providing support for a recording surface that is laminated to said base. The base support consists of paper or similar felted, compressed fibres. The paper may be weighed with clays or impregnated with resins, waxes or glues. The thickness of the paper may vary upwards from grades referred to as "onion skin" to 15 point stock. The recording surface is a smooth layer of thermosetting or thermoplastic material into which is induced an acoustic signal-generating deformation.

The acoustic signal-generating deformation may be a conventional recording surface, producing sound by mechanical means or it may be a photoelectric or magnetic sound signal-storing device.

The recording surface is laminated onto the paper support layer. The term laminated is intended to encompass the joining or fusing of adjacent surfaces. The joining may be accomplished by spraying, painting, coating, fusing or pressing the layers one upon the other. It is also possible to achieve such a joining by the use of adhesives and the compression of the sheets of the recording surface to the paper substrate.

The flat records of this invention are played in conventional manner and aligned around a hole which is adapted to accept the central spindle of the record player.

Figure 2:
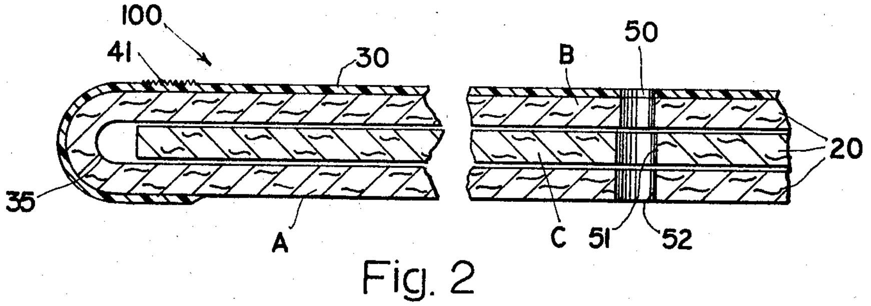
FIG. 2 is a partial section of the folded record of this invention according to the aspect of FIG. 1 showing in enlarged detail the sectional area near the folded edges and the areas in the vicinity of the spindle holes.
Figure 3:
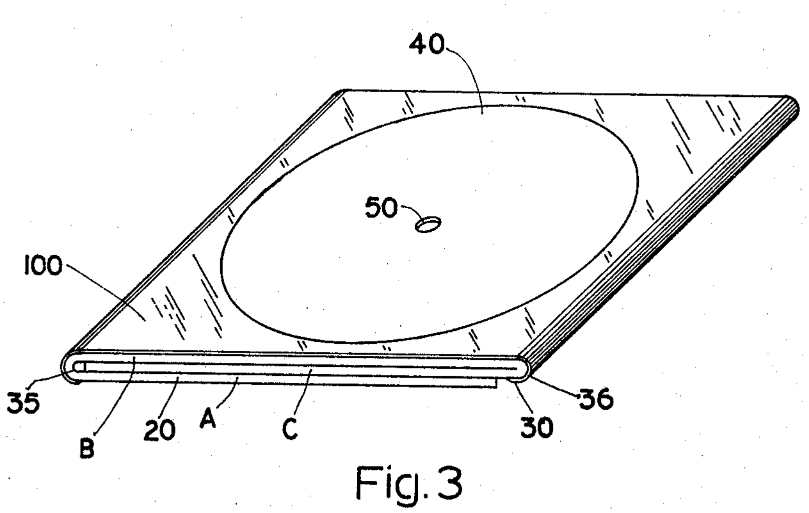
FIG. 3 is a perspective view of a record according to this invention folded and ready for playing on a phonograph.

Referring specifically to the embodiment shown in FIGURES 1 and 2 and the final record shown in FIG. 3, the record 100 consists of the paper base 20, divided into areas A, B, and C by dotted lines 36, 37 and a laminated area 30 on this paper base. The laminated area 30 extends completely over area B and encroaches into the margins of areas A and C covering therefore at least the middle third of the length of base 20. Dotted lines 35 and 36 dividing areas A, B, and C indicate the folds along which the record 100 is finally folded into the form shown in FIG. 3. In the central portion of the laminate area 30 is the circular record area 40. It consists of a helical groove 11, traced with spindle hole 50 as the center, sections of which are seen in the enlarged view of FIG. 2. The folds 35 and 36 parallel to each other are aligned with respect to spindle hole 50 to provide a final record of more or less square shape. Holes 51 and 52 in sections A and C are positioned so that after folding they will align with spindle hole 50, permitting the spindle of the record player to pass therethrough and to align record 100 and grooves 41 with respect to the center of the turntable of the record player.

Record 100 in its final folded form as shown in FIG. 3 is preferably square but may be rectangular. The positioning of folds 35 and 36 on opposite sides of area B provides stiffening and rigidity to the record 100 required that it will not warp and that it may be used on conventional record players with minimal acoustic distortion.

The record 100 can bear printed texts. These can be printed over the entire top and bottom surfaces of areas A, B, and C, and since the plastics used for laminating area 30 are usually transparent, the printed texts may extend completely under the recorded area 40.

The square record is preferred since it provides the maximum ratio of recording area for surface but rectanglar records may be required to contain additional texts or to conform to economical printing, binding or mailing requirements.

The final folded record if rectanglar should have folds 35, 36 along the major dimension of the rectangle. Tabs may be cut into the areas beyond the record or in the outer fold to provide an easy binding surface.

Figure 4:
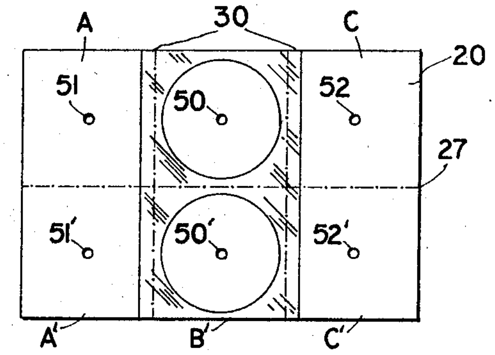
FIG. 4 is a plan view of an unfolded record sheet according to another aspect of this invention.

FIG. 4 shows an embodiment of this invention which provides certain additional advantages depending which aspect of the embodiment is exploited. The paper base 20 of this embodiment is laminated along area 30 with the required plastic material. Sheet 21 is subdivided into areas A, A′, B, B′ and C, C′ by folds 35 and 36 and line 27. Areas B and B′ each contain a record area 40 having a recording helix 41 around spindle hole 50. Spindle hole 50 in area B is aligned with a spindle hole 50′ in area B′ so that when base 20 is folded along line 27 both holes are in registry. Folds 35 and 36 are then creased to bend in either direction and holes 51, 51′, 52 and 52′ then register with holes 50 and 51. In this manner there is conveniently provided two sides of record surface on a single record and resulting from a single pressing on one side of the laminated paper sheet 30. Since paper records are so thin, in the order of thousanths of an inch thickness of lamination and paper base, it is difficult to press records on both sides of such a thin base. By using the above described aspect of the embodiment of FIGS. 4 and 5 such two-sided records can be achieved. The third fold along line 27 has been found to have no adverse effect on the warping characteristics of the final record. This record in appearance will be identical with the record of FIG. 3 but will merely be thicker. Folds 35 and 36 can be made to fold in either direction in the manner known to the printing arts and the laminates used lend themselves admirably to such purposes due to the greater flexibility and strength imparted to the paper base in the region of the fold by the plastic laminate. According to another aspect of this embodiment, it is possible to perforate or cut along line 27 instead of folding, thereby achieving two records according to FIG. 3 from a single pressing operation. After cutting the two records are folded along lines 35, 36 resulting in two records 100 according to FIG. 3.

Figure 5:
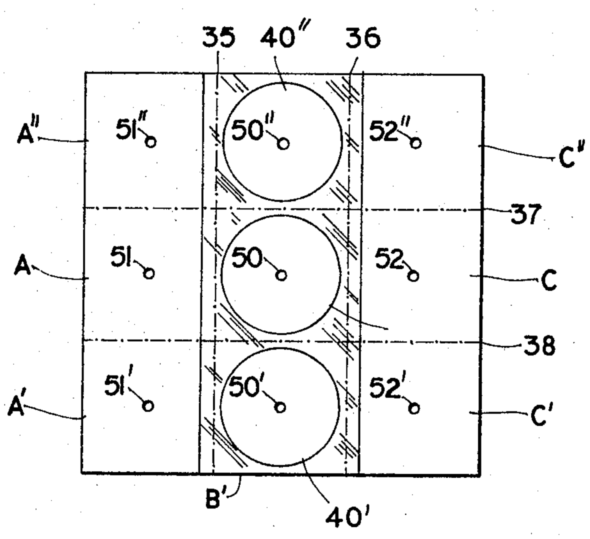
FIG. 5 is a plan view of an unfolded record sheet according to another aspect of this invention.
Figure 6:
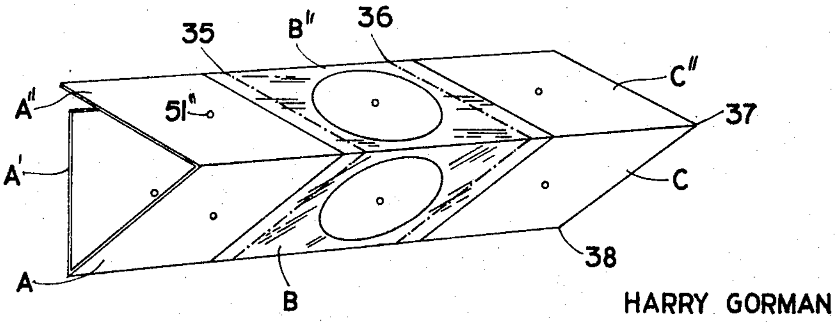
FIG. 6 is a perspective view of the record according to the aspect shown in FIG. 5, showing the manner of folding.

FIGURES 5 and 6 show another embodiment of this invention particularly useful where a maximum of record area and printed text is desired in a single sheet. The record 50 consists of paper base 20 which may be preprinted and is laminated with plastic material in area 30. Base 20 is subdivided into areas A, A′, A″, B, B′, B″ and C, C′, and C″ as defined by folds 35, 36, 37, and 38. Areas B, B′, B″ are completely within laminated area 30 which extends beyond folds 35 and 36 into the margins of areas A, A′, A″ and C, C′ and C″. Areas B, B′ and B″ may all bear record areas 40, 40′, 40″; or the recording may be confined to area B bearing record area 40. When all three record areas are utilized areas 40′, 40″ are exposed by alternating the order of folding of areas A′, B′, C′, A″, B″, C″ along folds 37, 38.

The records of this invention are manufactured by printing text material, if desired, on the paper base. The base is then strip-laminated in areas 30 with the plastic adapted for receiving the record either by fusion, pressure, adhesives of by spraying. Preferred recording plastics include cellulose acetate or vinyl chloride or acetate or natural lacquers. The record is then pressed by the use of metal record masters mounted on heated platens in presses. The spindle hole is punched in the same operation as the pressing of the record to insure proper positioning of the record on the turntable. After the record is pressed the record sheets are die cut and folded to yield the records of this invention.

An alternate method of manufacturing of the records of this invention entails the cutting and folding of the printed and laminated paper sheets which are then pressed in the record pressing machine. The latter process is particularly useful where limited pressure is available for the record pressing, as for example, in mechanical presses.

The embodiments of FIGS. 1, 2 and the single record embodiment of FIGS. 5 and 6 can be pressed after folding of the record sheet. The folding operation is performed in the usual folding machine and the folding operation may include the corrugation of the fold or a pricking of the folded composite to ensure the stability of the composite during the record pressing operation.

It has been found advantageous to have only one spindle hole 50 punched to the exact size of a record player spindle. The other spindle holes may be slightly larger. This provides some leeway in the folding operation without causing excessive "wobble" or "wow" when the record is played.

Included within the ambit of this invention is the embodiment of the paper record where the record is embossed and creased or folded and bound with perforations along one edge into a book, newspaper or magazine with instructions for detaching prior to playing.

The invention in several of its embodiments has been described and directions given to enable those skilled in the recording and printing arts to carry out the invention in its physical and mechanical aspects.

What is claimed is:

1. A phonograph record comprising a flat substrate; a surface layer of plastically deformable material laminated to said substrate, while overlying a central portion thereof; and a record impression formed in said surface layer on said central portion to provide thereon a record-receiving surface, said substrate being provided with a pair of opposite nonrecording marginal portions integral with said central portion and foldable under the latter along opposite parallel folds interconnecting said marginal and central portions while being substantially co-extensive therewith, said surface layer extending integrally beyond said opposite parallel folds interconnecting said marginal and central portions and overlying only a fraction of the total area of each marginal portion adjacent said central portion for stiffening the record, said central and marginal portions being provided with aligned apertures for receiving a phonograph spindle.

2. A record according to claim 1 wherein said substrate is provided with a further marginal portion intermediate the first mentioned marginal portions and contiguous therewith, said further marginal portion having a fold bridged by said surface layer and perpendicular to said opposite folds.

3. A record according to claim 1 wherein said substrate is provided with two further marginal portions intermediate the first mentioned marginal portions and contiguous herewith, said further marginal portions each having a fold bridged by said surface layer and perpendicular to said opposite folds.

References Cited by the Examiner

UNITED STATES PATENTS

| | | | |
|---|---|---|---|
| 1,438,078 | 12/1922 | Wright | 161—42 |
| 2,148,225 | 2/1939 | Zecha | 161—42 |
| 2,225,048 | 12/1940 | Hosin | 274—42 |
| 2,528,611 | 11/1950 | Saffady | 156—219 |
| 3,050,433 | 8/1962 | Sakamoto | 156—219 |
| 3,145,026 | 8/1964 | Shaw | 274—42 |

FOREIGN PATENTS 877,090 9/1961 Great Britain.

NORTON ANSHER, *Primary Examiner.*

E. M. BERGERT, *Examiner.*

H. F. EPSTEIN, CLIFFORD B. PRICE, *Assistant Examiners.*